United States Patent [19]

Stanley, Jr. et al.

[11] Patent Number: 4,833,198

[45] Date of Patent: May 23, 1989

[54] SUSPENDING AGENT FOR THE SUSPENSION POLYMERIZATION OF WATER-SOLUBLE MONOMERS

[75] Inventors: Frederick W. Stanley, Jr.; Jack C. Lamphere; Yohannes Chonde, all of Midland, Mich.

[73] Assignee: The Dow Chemical Company, Midland, Mich.

[21] Appl. No.: 757,237

[22] Filed: Jul. 22, 1985

[51] Int. Cl.$^4$ ................................................. C08K 3/34
[52] U.S. Cl. .................................... 524/560; 524/555; 524/577; 526/207
[58] Field of Search .................. 524/556, 560, 577

[56] References Cited

U.S. PATENT DOCUMENTS

| | | | |
|---|---|---|---|
| 3,629,209 | 12/1071 | McDonald | 526/307.2 |
| 4,028,285 | 6/1977 | Pillar | 524/577 |
| 4,048,272 | 9/1977 | Spicuzza, Jr. | 524/577 |
| 4,172,122 | 10/1979 | Kubik | 524/556 |
| 4,235,768 | 11/1980 | Ritter | 524/556 |
| 4,425,465 | 1/1984 | Padget | 524/450 |
| 4,431,765 | 2/1984 | Doshak | 524/426 |

*Primary Examiner*—Christopher Henderson

[57] ABSTRACT

A suspending agent useful in a water-in-oil suspension polymerization process comprises a fumed silica particulate having a hydrophobic character and a hydrophobic polymer. The suspending agent is useful in providing uniformly sized aqueous fluid absorbent polymer beads.

1 Claim, No Drawings

SUSPENDING AGENT FOR THE SUSPENSION POLYMERIZATION OF WATER-SOLUBLE MONOMERS

BACKGROUND OF THE INVENTION

This invention relates to suspension polymerization processes and in particular to the suspending agents employed in said processes.

Various water-soluble polymers such as polyacrylamide and copolymers of acrylamide with other anionic, cationic or nonionic monomers are well-known to be precipitants or flocculants for many substrates including sewage, cellulosic fibers and fines for retention and freeness, effluent waste for metal production, coal tailings and the like. Such polymers are also known to exhibit superior thickening properties when said polymers are dissolved in aqueous media. Particularly well known for this purpose are the anionic polyacrylamides such as acrylamide/acrylic acid copolymers, including those prepared by hydrolysis of polyacrylamide. Such polymers are also very useful as fluid mobility control agents in enhanced oil recovery processes.

In the past, such polymers have been made available commercially as powders or finely divided solids which must be subsequently dissolved in an aqueous medium in order to be used. Because such dissolution steps are sometimes time consuming and often require rather expensive mixing equipment, it has become a common practice to formulate the water-soluble polymers in water-in-oil emulsions wherein the polymer is dissolved in the dispersed aqueous phase. Such emulsions, as well as methods for preparing them, are described in U.S. Pat. Nos. 3,284,393; 3,826,771 and 4,052,353.

More recently, it has become desirable to provide aqueous fluid absorbents by polymerizing water-soluble monomers such as acrylic acid in the presence of a crosslinking agent in order to provide highly swellable polymeric materials. Such types of aqueous fluid absorbents and materials provided therefrom are disclosed in U.S. Pat. Nos. 4,511,477; 4,500,670; 4,424,247; and 4,293,609. Due to the nature of the crosslinking agents employed in the preparation of such aqueous fluid absorbents, the use of water-in-oil emulsion polymerization technology in providing such types of polymeric materials has not been successfully employed to any great extent.

Suspension polymerization processes provide several advantages in the preparation of water-soluble polymers and water-swellable polymers. The reaction temperature and rate of reaction can be controlled due to the heat transfer properties attendant in such types of polymerization processes. For example, the reaction temperature can be controlled by means of ebullient cooling. In addition, the polymer product so provided in water-in-oil suspension polymerization processes can be separated from the oil phase using relatively efficient techniques such as filtration or centrifugation. However, improvements in the preparation of water-soluble polymers and water-swellable polymers is clearly desirable.

In view of the deficiencies of the prior art, it would be highly desirable to provide a process for polymerizing water-soluble monomers using water-in-oil suspension polymerization techniques; which process is capable of employing high quantities of monomer in the aqueous phase without substantial agglomeration of polymer, and which process can be employed in providing crosslinked water-swellable polymers of a controlled particle size.

SUMMARY OF THE INVENTION

The present invention is a suspending agent useful in suspension polymerization processes, said suspending agent comprising (1) a particulate material comprising a hydrophobic character, and (2) a polymer having a substantially hydrophobic character said polymer having hydrophobic moieties pendant from the backbone thereof.

The aforementioned suspending agent is particularly useful in water-in-oil suspension polymerization processes.

In another aspect, the present invention is the oil phase useful in water-in-oil suspension polymerization processes, said oil phase comprising the aforementioned suspending agent.

In yet another aspect, the present invention is a water-in-oil suspension polymerization process wherein water-soluble monomers are polymerized, said process comprising
  (1) providing an aqueous phase comprising water and at least one water-soluble monomer, and
  (2) providing an oil phase comprising an inert hydrophobic liquid and the aforementioned suspending agent, and
  (3) contacting the aqueous phase and the oil phase under conditions such that a water-in-oil suspension of polymer comprising polymerized water-soluble monomer is provided.

In addition to their utility as additives in drilling muds, fracturing fluids and fluid mobility control agents in enhanced oil recovery methods, the water-soluble polymers prepared in accordance with the practice of the present invention are also useful as flocculating agents for sewages, industrial wastes, mining streams such as coal slurries and mining effluents, as thickeners for coating formulations, as additives for the manufacture of paper, and in a variety of other uses common for such polymers prepared by other conventional polymerization methods.

Polymers comprising a crosslinked character, which crosslinked character provides a swellable character to the polymer, are useful as aqueous fluid absorbent compositions. For example, such aqueous fluid absorbent polymer compositions can absorb several times their weight of an aqueous liquid, preferably more than about 15 times their weight in water. Such compositions can be employed in a wide variety of applications as are disclosed in U.S. Pat. Nos. 4,424,247; 4,511,477; 4,293,609 and 4,486,374.

Surprisingly, the use of the aforementioned suspending agent, when employed in suspension polymerization processes, can provide a polymerization product which exhibits a controlled particle size distribution. In addition, the polymerization products can be effectively dried using relatively energy efficient techniques such as steam distillation or azeotropic distillation. Of particular interest is the use of the suspending agent of this invention in providing water-swellable polymer products of controlled particle size.

DETAILED DESCRIPTION OF THE ILLUSTRATIVE EMBODIMENTS

The present invention is practiced in the preparation of water-in-oil suspensions containing any polymer provided from water-soluble monomers. Such suspensions are those wherein the dispersed phase is an aqueous phase having contained therein said polymer, and the continuous oil phase is a water-immiscible inert organic liquid. In suspensions of this invention, the percent of the aqueous phase to the oil phase is such that the suspensions contain from about 10 to about 70, preferably from about 40 to about 60, weight percent of aqueous phase. Advantageously, the suspension comprises preferably from about 90 to about 30, most preferably from about 60 to about 40, weight percent dispersed (i.e., aqueous) phase based on the total weight of the suspension. The amount of polymer contained in the suspension can vary providing that the resulting suspension is stable, and is advantageously from about 10 to about 50, more preferably from about 20 to about 40, weight percent polymer based on the total weight of the suspension. In the suspensions, the weight ratio of water to polymer in the aqueous phase can vary and is desirably from about 0:100 to about 9:1, more preferably from about 4:1 to about 1.5:1, and most preferably from about 2.33:1 to about 0.67:1.

For the purposes of this invention, the water-soluble polymer contained in the aqueous phase of the suspension is one that forms a thermodynamically stable mixture when combined with water. These mixtures form spontaneously and include true solutions in which the individual polymer molecules are dispersed as well as micellar or colloidal solutions wherein the polymer molecules are aggregated to some extent, but wherein such aggregates are no larger than colloidal size. Accordingly, such water-soluble polymers are generally homopolymers and copolymers of water-soluble ethylenically unsaturated monomers.

Suitable water-soluble monomers include those that are at least water-miscible and that are preferably sufficiently water-soluble to form at least a 5 weight percent solution when dissolved in water and readily undergo addition polymerization to form polymers that are water-soluble. Exemplary water-soluble monomers include ethylenically unsaturated amides such as acrylamide, methacrylamide and fumaramide; their N-substituted derivatives such as 2-acrylamide-2-methylpropane sulfonic acid (AMPS® a registered trademark of The Lubrizol Corporation), N-(dimethylaminomethyl-)acrylamide as well as N-(trimethylammoniummethyl-)acrylamide chloride and N-(trimethylammoniumpropyl)methacrylamide chloride; ethylenically unsaturated carboxylic acids such as acrylic acid, methacrylic acid, itaconic acid and fumaric acid; ethylenically unsaturated quaternary ammonium compounds such as vinylbenzyl trimethyl ammonium chloride, sulfoalkyl esters of unsaturated carboxylic acids such as 2-sulfoethyl methacrylate; aminoalkyl esters of unsaturated carboxylic acids such as 2-aminoethyl methacrylate and 2-(N,N-dimethylamino)-ethyl methacrylate as well as the quaternized derivatives thereof such as acryloylethyl trimethyl ammonium chloride; vinyl amines such as vinyl pyridine and vinyl morpholine, diallyl amines and vinyl ammonium compounds such as diallyl dimethyl diallyl ammonium chloride; vinyl heterocyclic amides such as vinyl pyrrolidone; vinylaryl sulfonates such as vinylbenzyl sulfonate as well as the salts of the foregoing monomers. Of the foregoing water-soluble monomers, acrylamide and combinations of acrylamide and acrylic acid are preferred. Homopolymers of acrylic acid can also be prepared. Homopolymers prepared from acrylamide and copolymers prepared from combinations thereof with other water-soluble monomers are more preferred. Also preferred are polymers wherein the water-soluble monomers range from about 5 to about 99 mole percent of acrylamide and/or partially hydrolyzed acrylamide from about 1 to about 5 mole percent of other water-soluble monomers. Of particular interest are lightly crosslinked polymers such as polyacrylic acid polymers, sodium polyacrylate polymers, and copolymers of polymerized acrylic acid and sodium acrylate; which polymers are copolymerized with polyvinyl monomers such as trimethylolpropane triacrylate.

The water-immiscible oil phase of the suspension generally comprises at least one inert hydrophobic liquid. Usually such liquid is an organic liquid such as a liquid hydrocarbon or substituted hydrocarbon. Preferred organic liquids are the halogenated hydrocarbons such as perchloroethylene, methylene chloride and the like as well as liquid hydrocarbon having from 4 to 15 carbons per molecule including aromatic and aliphatic hydrocarbons and mixtures thereof, e.g., benzene, xylene, toluene, mineral oils, liquid paraffins such as kerosene, naphtha and the like. Of the foregoing organic liquids, the hydrocarbons are the more preferred, with aliphatic hydrocarbons being most preferred.

The suspension polymerization processes are performed by following the general procedures described in the art as exemplified in U.S. Pat. Nos. 4,340,706; 4,367,323 and 4,446,261, which are hereby incorporated by reference. In the process of this invention, an aqueous phase containing water-soluble monomer(s) typically is dispersed in the inert hydrophobic liquid which contains the suspending agent of this invention. Typically, it is desirable to agitate the resulting composition. Factors such as the rate of agitation of the composition control properties such as the droplet or particle size of the suspended aqueous phase.

The suspending agent of this invention comprises two necessary components; the particulate material having a hydrophobic character and the polymer having a substantially hydrophobic character.

The particulate material comprising a hydrophobic character can be described as an amorphous, highly oil dispersable, approximately micron size, substantially water-insoluble particulate material. Typically, the size of the particulate material ranges from less than 1 micron to several microns in diameter. The particulate material is most preferably hydrophobic silicon dioxide such as that particulate material provided by the reaction of silica with polydimethyldichlorosilane. Other useful particulate materials include hydrophobic clays such as the cationic surfactant treated bentonite clays. An example of a hydrophobic clay is sold commercially as Bentone® 34 by N. L. Industries.

The polymer having a substantially hydrophobic character has hydrophobic moieties pendant from the backbone thereof. The hydrophobic groups of the polymer having a substantially hydrophobic character are preferably pendant organic groups having hydrophobicities comparable to one of the following: aliphatic hydrocarbon groups having at least about four carbons such as $C_4$ to $C_{20}$ alkyls and cycloalkyls; aromatic hydrocarbon groups such as alkylaryls wherein alkyl has one or more carbons, preferably 4 to 8 carbons; haloalkyls of 4 or more carbons, preferably perfluoroalkyls; polyalkyleneoxy groups wherein alkylene is propylene or higher alkylene and there is at least 1 alkyleneoxy unit per hydrophobic moiety.

Suitable hydrophobic monomers include those which are (1) water-insoluble, i.e., less than about 0.4, preferably about 0.2, weight part of the hydrophobic monomer will dissolve in 100 weight parts water and (2) ethylenically unsaturated compounds having hydrophobic groups as defined hereinbefore. Exemplary hydrophobic monomers include the higher alkyl esters of $\alpha,\beta$-ethylenically unsaturated carboxylic acids such as dodecyl acrylate, dodecyl methacrylate, tridecyl acrylate, tridecyl methacrylate, tetradecyl acrylate, tetradecyl methacrylate, octadecyl acrylate, octadecyl methacrylate, ethyl half ester of maleic anhydride, diethyl maleate, and other alkyl esters derived from the reactions of alkanols having from 4 to about 20, preferably from 8 to about 20, carbon atoms with ethylenically unsaturated carboxylic acids such as acrylic acid, methacrylic acid, fumaric acid, itaconic acid and aconitic acid, and maleic anhydride; alkylaryl esters of ethylenically unsaturated carboxylic acids such as nonyl-$\alpha$-phenyl acrylate, nonyl-$\alpha$-phenyl methacrylate, dodecyl-$\alpha$-phenyl acrylate and dodecyl-$\alpha$-phenyl methacrylate; N-alkyl, ethylenically unsaturated amides such as N-octadecyl acrylamide, N-octadecyl methacrylamide, N,N-dioctyl acrylamide and similar derivatives thereof; $\alpha$-olefins such as octene-1, decene-1, dodecene-1 and hexadecene-1; vinyl alkylates wherein alkyl has at least 8 carbons such as vinyl laurate and vinyl stearate; vinyl alkyl ethers such as dodecyl vinyl ether and hexadecyl vinyl ether; N-vinyl amides such as N-vinyl lauramide and N-vinyl stearamide; and arylalkylstyrenes such as t-butyl styrene. Of the foregoing hydrophobic monomers, the alkyl esters of acrylic acid, methacrylic acid, N-alkyl acrylamides and N-alkyl methacrylamides wherein alkyl has from 8 to 20 carbon atoms, the alkyl styrenes wherein alkyl has from 4 to 8 carbons such as t-butyl, are preferred. The alkylmethacrylates and alkylacrylates wherein alkyl has from 10 to 20 carbon atoms are more preferred. Dodecyl methacrylate and N-dodecyl methacrylamide are the most preferred where hydrolysis is not a problem.

The polymer having a substantially hydrophobic character is advantageously prepared by polymerizing the aforementioned hydrophobic monomers and optionally other monomers such as hydrophilic monomers in an oil phase using conventional initiators or catalysts. The polymers typically have molecular weights of about 1,000 to about 100,000. The amount of hydrophilic monomer polymerized with the hydrophobic monomers depends upon factors such as the types of water-soluble polymers which are provided and typically ranges from greater than 0 to about 15 percent. For example, the amount of hydrophilic monomer which is polymerized in the polymer having the substantially hydrophobic character can vary depending upon factors such as those attendant when water-soluble copolymers are prepared from two or more varying monomers.

The amount of components comprising the suspending agent can vary. The amount of each component depends upon factors such as the desired particle size distribution of the polymer product. The amount of each ranges from about 5 to about 95 weight percent, relative to one another.

The amount of suspending agent employed depends upon factors such as that amount necessary to provide a suspended aqueous phase in the oil phase while employing an amount which is economically low. The amount typically ranges from about 0.05 to about 10 weight percent relative to the amount of water-soluble monomer which is being polymerized.

The suspending agent is incorporated into the oil phase using a variety of techniques. For example, it is desirable to contact the oil phase with the suspending agent under conditions such as agitation.

Polymerization of the water-in-oil suspension of the water-soluble monomer(s) is advantageously effected under conventional conditions such as described in U.S. Pat. Nos. 4,340,706; 4,367,323 and 4,446,261. Normally, such polymerization is practiced in the presence of a polymerization initiator capable of generating free-radicals. Preferably, this free-radical initiator is employed in amounts from about 0.01 to about 0.1 weight percent of initiator based on the monomers. Exemplary polymerization initiators include the inorganic persulfates such as potassium persulfate, ammonium persulfate and sodium persulfate; azo catalysts such as azobisisobutyronitrile and dimethylazoisobutyrate; organic peroxygen compounds such as benzyl peroxide, t-butylperoxide, diisopropylbenzene hydroperoxide, t-butyl hydroperoxide; and compounds such as sodium borohydride. Of these initiators, the organic types such as t-butyl hydroperoxide are preferred. In addition to the aforementioned ingredients, the suspension polymerization recipe optionally includes chain transfer agents, chelating agents, buffers, salts, and the like.

If desired, a crosslinking agent can be incorporated into the polymerization process. The crosslinking agent can be incorporated into the aqueous phase, the oil phase, or in the presence of both the aqueous phase and the oil phase. The crosslinking agent can be employed in an amount sufficient to provide to the polymerization product an effective increase in molecular weight, or to provide to the polymerization product a water-swellable character as is desirable in aqueous fluid absorbent compositions, or to provide a hydrogel product. For example, oil-soluble polyvinyl crosslinking monomers can be incorporated into the oil phase. Examples of polyvinyl crosslinking monomers include N,N'-methylene-bisacrylamide, divinylbenzene, diethylene glycol diacrylate, propylene glycol dimethacrylate, allyl acrylate, diallyl fumarate, trimethyloylpropanetriacrylate, and the like. Examples of other crosslinking monomers include polyhaloalkanols; sulfonium zwitterions; haloepoxyalkanes; polyglycidyl ethers; aminoepihalohydrin adducts; multivalent metal ions such as aluminum or calcium; glycidyl acrylates; and the like. The amount of crosslinking agent depends upon a variety of factors, but typically ranges from about 0.01 to about 1 percent based on the weight of the polymer.

After the polymerization reaction is complete, the suspension can be employed in a variety of ways. For example, the suspension can be (a) employed as is, (b) treated using centrifugal techniques in order to separate the polymer from the oil, (c) precipitated using agents such as methanol or acetone, (d) filtered, or (e) spray dried.

The molecular weight of the water-soluble polymer or water-swellable polymer is not particularly critical and may vary over a wide range. Typically, molecular weights range from about 100,000 to about 50 million depending on the desired use of the polymer. Preferred polymers have weight average molecular weight in the range from about 2 to about 25 million. It is understood that the molecular weights of the crosslinked polymers can be essentially infinite.

The following examples are given to further illustrate the invention but not to limit its scope. All parts and percentages are given by weight unless otherwise indicated.

EXAMPLE 1

A. Preparation of Laurylmethacrylate/Acrylic Acid Copolymer

To 795.4 g of laurylmethacrylate is added 4.64 g of glacial acrylic acid and 800 g of liquid hydrocarbon sold commercially as Isopar ® M by Exxon. Then 0.8 g of 2,2'-azobis(2,4-dimethylvaleronitrile) which is sold commercially as Vazo ® 52 by E. I. duPont de Nemours Corporation is added. The solution is agitated, purged with nitrogen for 1 hour and then heated to 50° C. After 12 hours of heating, the temperature of the thickened solution is increased to 60° C. and held there for 2 hours. It is then cooled and mixed with another 800 g of the aforementioned liquid hydrocarbon to give a 33 percent polymer solution.

B. Suspension Polymerization of Crosslinked Sodium Polyacrylate 131 g of glacial acrylic acid is mixed with 167 g of water. Then a 50 percent aqueous solution of sodium hydroxide is added dropwise, while keeping the temperature less than 50° C. Addition is continued until the pH of the solution is 6.0. To this mixture is added 0.6 g of pentasodium salt or diethylenetriamine pentaacetic acid sold commercially as Versenex ® 80 by The Dow Chemical Company, and the total weight of the aqueous phase is adjusted to 490 g with additional water.

The oil phase is prepared by adding 4.28 g of hydrophobic fumed silica sold as Aerosil ® R-972 by Degussa and 12.82 g of 33.3 percent 99 mole percent laurylmethacrylate/1 mole percent acrylic acid copolymer in the liquid hydrocarbon to 432.9 g of the liquid hydrocarbon.

The aforementioned Aerosil ® R-972 component is dispersed by mixing the mixture with a Waring blender at medium agitation. The oil phase is then transferred to a 1-liter reactor. The crosslinking agent, 0.4275 g of trimethylolpropane triacrylate, is added to the oil phase. Then 0.0684 g of sodium persulfate and 0.0977 g of a 70 percent aqueous solution of t-butylhydroperoxide are added to the aqueous phase. The agitator on the 1-liter reactor is set at 500 rpm and the aqueous phase is added quickly to the oil phase. The reactor is purged with $N_2$ for 1 hour and initiated by adding a nitrogen stream containing 1000 ppm $SO_2$ at a rate of 50 cc/min through a dip tube. The reactor jacket is heated to 40° C. over a 10-minute period. This controls the actual polymerization temperature to about 50° C. After an hour, the jacket is heated to 60° C. and maintained for an additional hour. The slurry is then cooled, centrifuged to remove excess liquid hydrocarbon and the product is air dried.

EXAMPLE 2

A water-soluble copolymer of acrylamide and acrylic acid is provided as follows:

An aqueous phase is provided by mixing 241.8 g of aqueous acrylamide solution (48 percent acrylamide) and 16.85 g of glacial acetic acid with 69.8 g of water. To this mixture is added 0.28 g of the aforementioned Versenex 80 and enough of a 50 percent sodium hydroxide solution to bring the pH of the mixture to 6.5. Additional water is added to give a total weight of the mixture of 350 g.

An oil phase is provided by adding 3.5 g of the aforementioned Aerosil ® R-972 and 10.5 g of a 33 percent solution of a copolymer of laurylmethacrylate and acrylic acid. The mole ratio of laurylmethacrylate to acrylic acid is 95:5. The copolymer is blended with 336 g of the aforementioned Isopar M hydrocarbon.

To the aforementioned aqueous phase is added 0.7 g of isopropyl alcohol and 0.05 g of a 70 percent aqueous solution of t-butylhydroperoxide. The oil phase is transfered to a 1-liter reactor and stirred at 300 rpm. The aqueous phase is added to the oil phase and then the suspension is purged for 1 hour with nitrogen. The polymerization is initiated by adding $SO_2$ at a flow rate of 0.05 cc/minutes. The reaction is held at 50° C. for 1 hour and then heated to 60° C. for an additional hour.

The polymer is isolated by filtering off the hydrocarbon phase and drying (i.e., the Isopar M) and drying the beads in a forced air dryer at 90° C. The product is a spherical free-flowing solid. The viscosity of 0.3 percent solution of the polymer in 3 percent sodium chloride at a pH of 7 is 16 cps as determined using an Ostwald viscometer.

EXAMPLE 3

A copolymer comprised of 70 mole percent acrylamide and 30 mole percent acrylic acid is provided as follows:

An aqueous phase weighing 318 g is provided by mixing 165 g of a 49.4 percent aqueous acrylamide solution with 35 g of glacial acrylic acid and 0.254 g of the aforementioned Versenex 80. To this solution is added enough of a 50 percent sodium hydroxide solution to adjust the pH to 6.5, 0.0727 g of tertiary butyl hydroperoxide and water to provide the aforementioned 318 g total weight.

An oil phase weighing 381.86 g is provided by mixing 3.18 g of the aforementioned Aerosil ® R-972 composition with 318 g of a polylaurylmethacrylate polymer with 375.5 g of the Isopar M hydrocarbon.

The aqueous phase is added to the oil phase in a 1-liter reactor while agitating at 450 rpm. The mixture is purged for 1 hour with nitrogen and initiated by adding $SO_2$ at a flow rate of 0.05 cc/minute. Shortly after initiation the suspension fails, coalescing into large mass of polymer.

The aforementioned experiment is repeated, except that the polylaurylmethacrylate polymer is replaced with 3.18 g of a copolymer of 99 mole percent laurylmethacrylate and 1 mole percent acrylic acid. The suspension is agitated with $SO_2$ and heated to 50° C. for 1 hour. The suspension partially fails giving large chunks of agglomerated beads.

The above experiment is further repeated replacing the 1 mole percent acrylic acid/99 mole percent laurylmethacrylate copolymer, with 3.18 g of a 2.5 mole percent acrylic acid/97.5 mole percent laurylmethacrylate copolymer. The polymerization proceeds smoothly. After polymerizing at 50° C. for one hour, the product is isolated by filtering off the hydrocarbon (i.e., the Isopar M) and drying the beads. Microscopic examination shows that the polymer consists of small agglomerates of polymer beads.

The above experiment is further repeated by replacing the 2.5 mole percent acrylic acid/97.5 mole percent laurylmethacrylate copolymer with 3.18 g of a 5 mole percent acrylic acid/95 mole percent laurylmethacrylate copolymer. The polymerization is run as described hereinbefore. Microscopic examination shows that the product consists of spherical polymer heads free from any signs of agglomeration.

EXAMPLE 4

A crosslinked polymer is provided as follows:

An aqueous phase is provided by mixing 116.4 g of glacial acrylic acid, 0.53 g of the aforementioned Versenex 80, enough of a 50 percent aqueous sodium hydroxide solution to adjust the pH to 6 and enough water to provide a 400 g total aqueous phase.

An oil phase weighing 400 g is provided by mixing 1.14 g of the aforementioned Aerosil® R-972, a copolymer of 99 mole percent laurylmethacrylate and 1 mole percent acrylic acid, 0.456 g of trimethylolpropanetriacrylate and 397.7 g of Isopar M hydrocarbon.

To the aqueous phase is added 0.0868 g of t-butyl hydroperoxide and 0.0608 g of sodium persulfate to the aqueous phase which is in turn added to a 1 liter reactor containing the oil phase. The agitator on the reactor is set at 450 rpm. The mixture is purged with nitrogen for 1 hour and polymerization is then initiated at 25° C. by the addition of $SO_2$ at the rate of 0.0833 cc/minute. The reaction is heated to 50° C. and is held at this temperature for 1 hour. The temperature is then increased to 60° C. and held there for an additional hour.

The reaction mixture is cooled to room temperature and the Isopar M hydrocarbon is removed by filtration. The polymer beads are dried in a forced-air dryer at 90° C.

The water-retention capacity of the polymer so provided is determined to be 75 g of a 0.9 percent aqueous sodium chloride solution per gram of polymer. The amount of extractable polymer is 2.5 percent. The extractable polymer is determined by contacting a polymer sample in a 0.9 percent aqueous sodium chloride solution and shaking for 16 hours.

The extractable polymer test is rerun except that a mixture of 0.9 percent aqueous sodium chloride and polymer beads are sheared for 10 seconds in a Waring blender at high speed. The sample is filtered and titrated as usual. The extractables of this sample increase to 5.6 percent.

The aforementioned polymerization process is repeated except that the $SO_2$ flow rate initiation is increased to 0.108 cc/minute. The polymer is isolated as described hereinbefore. The resulting polymer exhibits a higher capacity while maintaining low extractables as indicated by a retention capacity of the 0.9 percent aqueous sodium chloride solution of 90 g per gram of polymer and the polymer extractables value of 5.36 percent and a further extractable of a similarly shear product of 11.8 percent.

The aforementioned experiments indicate that the polymerization conditions can affect polymer water-retention capacity. For example, increasing the $SO_2$ flow rate increases the capacity of the polymer. The above experiment also indicates that due to the fact that a higher percentage of polymer extractables are provided in the shear bead examples that it is believed that the copolymer beads are more highly crosslinked near the surface of the particles.

EXAMPLE 5

A crosslinked polymer is provided as follows:

An aqueous phase weighing 308 g is provided by mixing 87 g of glacial acrylic acid, 0.228 g of the aforementioned Versenex 80, enough of a 50 percent sodium hydroxide solution to adjust the pH to 8 and water.

An oil phase is provided by mixing 4.27 g of Aerosil® R-972, 1.42 g of a 99 mole percent laurylmethacrylate/1 mole percent acrylic acid copolymer, 0.456 g of diethyleneglycoldiacrylate and 336.76 g of Isopar M hydrocarbon.

The aqueous phase is mixed with 0.0468 g of a 70 percent solution of t-butyl hydroperoxide and 0.0468 g of sodium persulfate with the aqueous phase. This aqueous phase is added to the oil phase in a 1-liter reactor. Agitation during addition is 450 rpm. The reactor is purged with nitrogen for 1 hour and then the polymerization is started by adding $SO_2$ at the rate of 0.0833 cc/minute. The polymerization is held at 50° C. for 1 hour and then the mixture is heated to 60° C. for an additional hour. The beads are separated by filtering off the excess Isopar M and dried in a forced-air oven at 90° C. The water-retention capacity of the beads so provided is 59 g of the 0.9 percent sodium chloride solution per gram of polymer.

What is claimed is:

1. A suspending agent useful in suspension polymerization processes, said suspending agent comprising (1) fumed silicon dioxide, and (2) a copolymer of acrylic acid and lauryl methacrylate.

* * * * *